Nov. 13, 1962  B. F. ANTHONY  3,063,111
BOTTOM RINGS FOR COMPOSITE HOT TOPS
Filed Sept. 17, 1957  2 Sheets-Sheet 1
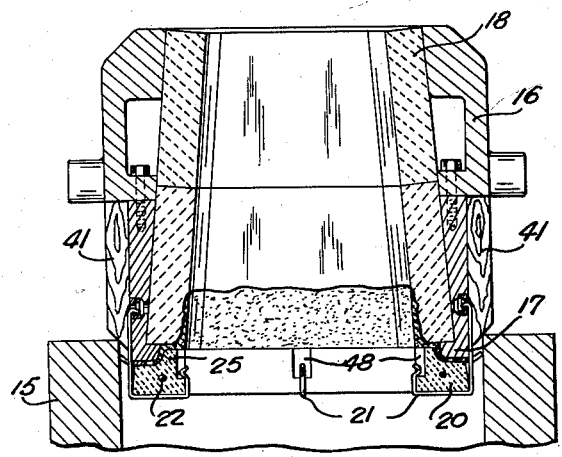
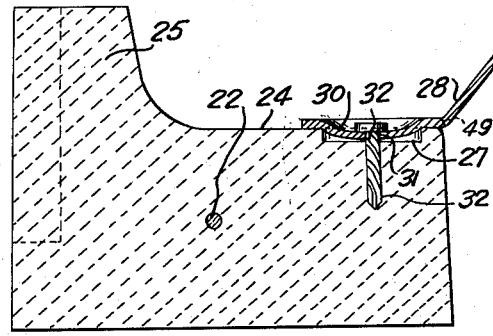
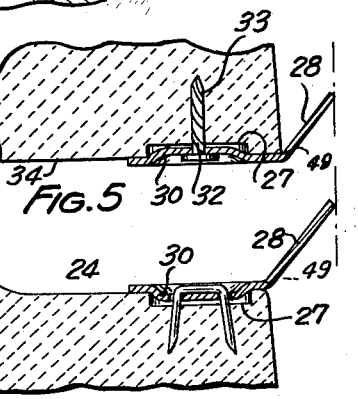
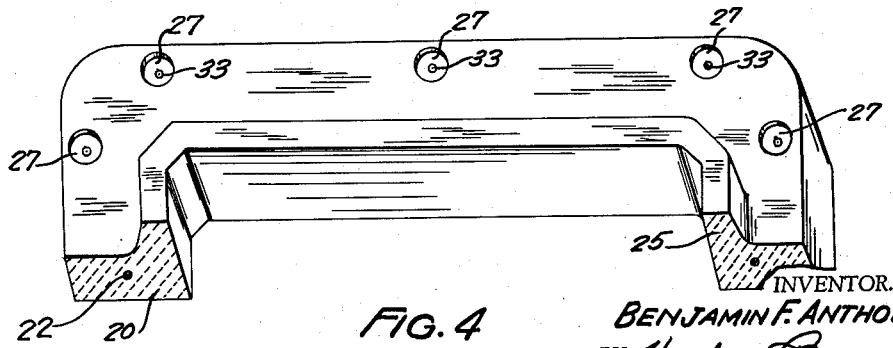
INVENTOR.
BENJAMIN F. ANTHONY
BY Hudson, Boughton,
Williams, David & Hoffmann
ATTORNEYS Nov. 13, 1962 B. F. ANTHONY 3,063,111
BOTTOM RINGS FOR COMPOSITE HOT TOPS
Filed Sept. 17, 1957 2 Sheets-Sheet 2

INVENTOR.
BENJAMIN F. ANTHONY
BY Hudson, Broughton,
Williams, David & Hoffmann
ATTORNEYS

United States Patent Office 3,063,111
Patented Nov. 13, 1962

3,063,111
BOTTOM RINGS FOR COMPOSITE HOT TOPS
Benjamin F. Anthony, Cleveland Heights, Ohio, assignor, by mesne assignments, to Oglebay Norton Company, Cleveland, Ohio, a corporation of Delaware
Filed Sept. 17, 1957, Ser. No. 684,555
2 Claims. (Cl. 22—147)

This invention relates to bottom ring units for composite hot tops, and has to do primarily with bottom rings wherein metallic wiper strip means is incorporated in or integrated with the bottom ring by the ring maker. Heretofore wiper strips and bottom rings have been shipped separately to the steel mills by the supplier or suppliers and the wiper strips mounted on the hot top as a separate part in conjunction with the mounting of the bottom ring thereon.

In this prior procedure some little variation in the accuracy of the assembly necessarily takes place, as the human element is an important factor. Also, assembly in the mill is not performed under the best and easiest conditions and is consequently not as efficient as it might be.

In accordance with the present invention the wiper strips, formed in sections in order to avoid waste of material, are assembled onto and integrated with the bottom rings by the makers of the rings. They are mounted securely and are not dislodged during handling and shipment and, in effect, the ring and the wiper strips secured thereto constitute a single handling unit. In the steel mill, the mounting of the combined bottom ring and wiper strip means is a simple procedure and requires a minimum amount of time.

One of the objects of the invention, therefore, is the provision of bottom rings complete with wiper strips constituting integrated units, facilitating shipping, handling, storage and the assembly of the hot top and its parts in the steel mill.

Another object is the provision of a molded bottom ring having depressions in a horizontal surface thereof, which takes sheet metal wiper strips provided with bosses that fit into the depressions and are fastened therein, affording a locked-together construction which resists effectively any force tending to separate the wiper strips from the bottom ring.

Additional objects of the invention are the elimination of inventory of wiper strips and the elimination of waste when wipers are carelessly thrown aside because too many were picked up for the preparation of the hot tops.

Other objects and features of novelty will appear as I proceed with the description of those embodiments of the invention, which for the purposes of the present application I have illustrated in the accompanying drawings, in which —

FIG. 1 is a vertical, sectional view showing a composite hot top set into the cavity of an ingot mold, wherein the bottom ring and wiper strip means are built together or integrated and mounted on the hot top as a unit;

FIG. 2 is a vertical, sectional view on a larger scale through the bottom ring per se, showing the wiper strip means integral with an upper surface of the bottom ring;

FIG. 3 is a plan view of a wiper strip section designed for a rectangular hot top;

FIG. 4 is a perspective view of a fragment of a bottom ring before the wiper strip or strips are assembled thereupon and integrated therewith;

FIG. 5 is a vertical, sectional view of a bottom ring, wherein the wiper strip is secured to a horizontal bottom surface of the ring;

FIG. 6 is a sectional view similar to FIGS. 2 and 5, wherein the wiper strip is mounted on and secured to an upper horizontal surface of the bottom ring, but in which a different type of fastener is employed;

Figure 7:
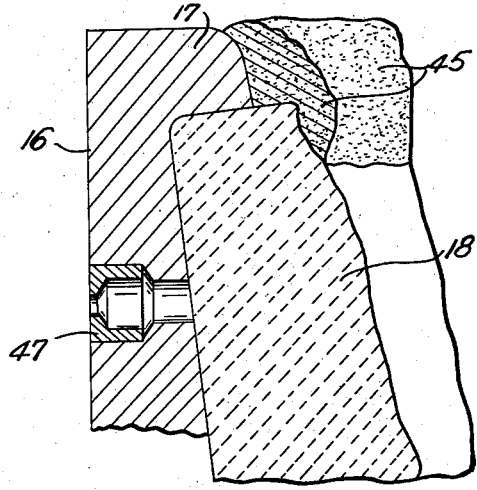
Figure 8:
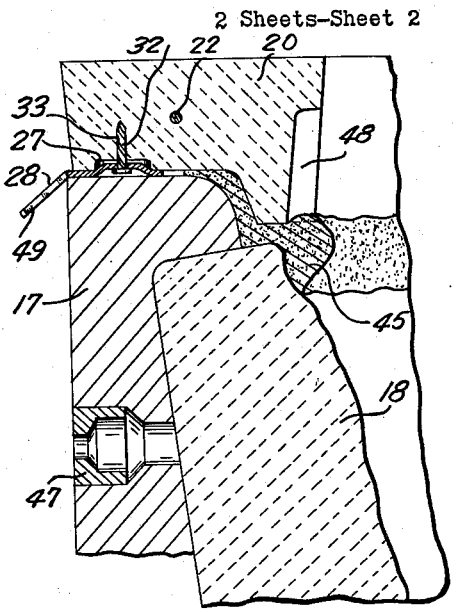
Figure 9:
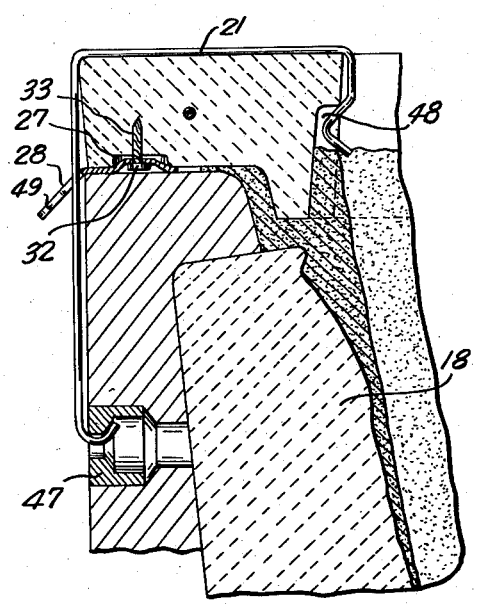
Figure 10:
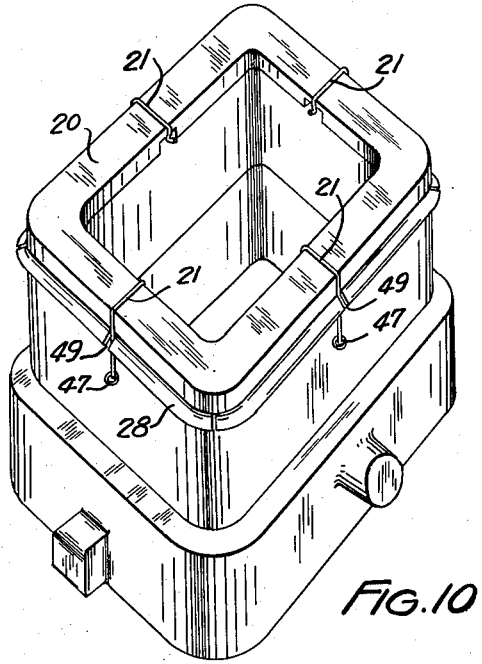

FIGS. 7, 8, and 9 are vertical, sectional views of a fragment of an inverted hot top, showing successive steps in the servicing of a hot top, and the mounting thereon of a combined or integrated bottom ring and wiper strip unit; and FIG. 10 is a perspective view of an inverted hot top built and assembled in accordance with the invention.

In FIG. 1 the upper end of an ingot mold is illustrated at 15. The hot top casing of cast iron or the like is shown at 16. The hot top assembly is supported in the mold by blocks 41, which are knocked aside after molten metal has been poured in the hot top, so that the hot top may float downward with the shrinking ingot shell. The casing has an inturned lower ledge 17 which supports the lower tier of semi-permanent lining blocks 18, which are formed of refractory material for maintaining the metal in the hot top molten while the ingot proper is cooling and while molten metal is being fed down to fill the pipe formed at and near the axis of the ingot by the shrinking of the cooling metal.

As is common in the art, the hot top includes a refractory bottom ring 20 which is hung onto the casing 16 by means of wire clips 21, well known in the art, but shown and described in Charman Patent 2,080,848, dated May 18, 1937.

It is desirable to employ a reinforcement in the bottom ring such, for example, as a steel rod 22 bent to the general shape of the ring.

The bottom ring may have a cross-sectional shape more or less like that illustrated in FIG. 2, with a substantially horizontal surface 24 which underlies the bottom ledge 17 of the casing and with an upwardly extending inner wall 25 which fills, more or less the annular cavity formed between the ledge 17 and the overhanging portion of the lower lining blocks 18. The bottom ring, therefore, protects the inner surface of the ledge 17 and the bottom surface of the semi-permanent lining.

In preparing the hot top for use according to conventional practice, the bottom ring is placed on the lower end of the casing, then the separate wiper strips are pushed into the joint between the lower end of the casing and the upper surface of the bottom ring after which both the bottom ring and the wiper strips are secured to the casing by means of wire clips and are held in position by the casing and bottom ring between which the wiper strips are sandwiched.

In the flat, horizontal surface 24 of the bottom ring as herein constituted there are formed during the molding of the ring a series of depressions 27 disposed near the perimeter of the ring. These depressions are preferably circular, as shown in FIG. 4. The wiper strip means is shown at 28 in FIGS. 2, 5, and 6. It is formed as a sheet metal stamping, which could be made as a continuous member, but preferably is made in sections like that shown in FIG. 3, in order to conserve material.

Each wiper strip section is provided with a plurality of bosses 30 dimensioned and located to fit within the depressions 27, the bosses being preferably pierced in the middle to provide holes 31 for the reception of nails 32 or other fastenings. In cases where roughened or spiraled nails are used, as in FIGS. 2 and 5, the body of the bottom ring may or may not have holes 33 molded therein, disposed centrally of the depressions 27 so that the nails may be readily driven into position to securely attach the wiper strip means to the ring.

In the modification of FIG. 5 the depressions 27 are formed in the lower horizontal surface 34 of the bottom ring instead of in the upper surface, the construction otherwise being like that of FIG. 2.

FIG. 6 shows a further modification which is similar to the FIG. 2 form, but in which the fastening extending through each boss 30 into the body of the bottom ring is a staple. In this case, as well as in the case of the roughened nails 32, the fastenings may be driven into the ring either manually or by power means in an automated production line.

While metal fasteners are preferred as a means for attaching or integrating the wiper strip means to or with the bottom ring, it is feasible to cement the wiper strip to the ring by the use of asphalt, rubber base, or resinous adhesives, especially in conjunction with the depressions and bosses above described.

It will be understood that the cooperating depressions and bosses formed on the bottom rings and the wiper strip means constitute interengaging locating portions of the bottom rings and wiper strip means which assure locating the wiper strip means in predetermined position on the supporting surface of the bottom ring.

Referring now to FIGS. 7, 8, and 9, there is shown an inverted casing 16, it being most convenient to service the hot tops while in inverted position. The lower edges of the lining bricks 18, after some use, become worn away, largely because of the excessive heat in those areas. The first step is to apply grout 45 to the joint between the ledge 17 and the lining 18. Then the bottom ring 22 with the wiper strip 28 attached thereto is inverted and placed as a unit upon the ledge 17. In this step the grout 45 is compressed and forced into all crevices to completely seal the joint. Next, the wire clips 21 are applied, the hooked end 46 of each clip being first inserted into a renewable socket member 47, and the other end of the clip being swung over the bottom ring and sprung into one of the small slots 48 in the inner side of the ring, the ring, of course, being first so positioned as to cause the slots 49 in the wiper strip and the slots 48 in the bottom ring to properly align themselves angularly. Additional grout may now be supplied and troweled to provide a smooth interior surface for the lower portions of the hot top, as indicated in FIG. 9.

It will be seen from the foregoing that the integrated bottom ring unit can be shipped as a single article of manufacture from the maker to the mill, can be handled and stored as single units as distinguished from the handling and storing of separate bottom rings and separate wiper strips and can be applied as a unit to the bottom end of the hot top when it is being prepared for use on the mold. Consequently the integrated bottom ring units embodying the present invention constitute an article of manufacture and facilitate shipping, handling and storage and make these operations more economical. Also the fact that the units are applied to the hot top in a single operation effects in the aggregate a substantial saving of time in the preparation of the hot tops in the mill for use on the ingot molds.

Although several preferred embodiments of the invention have been illustrated and described herein, it will be understood that the invention is susceptible of various modifications and adaptations as come within the scope of the appended claims.

Having thus described my invention, what I claim is:

1. An article of manufacture constituting a single use integrated bottom ring unit for application to a hot top of the type having a metal casing provided at its bottom end with an inturned ledge that supports the refractory lining of the hot top; said integrated unit comprising a refractory bottom ring adapted when applied to the bottom end of the hot top to cover the bottom surface of said ledge, said refractory ring having a surface which is horizontal when the unit is applied to the hot top, and sheet metal wiper strip means carried by said surface of said ring and projecting outwardly beyond the periphery of the ring, said surface of the ring and said wiper strip means having spaced interengaging portions locating the wiper strip means in predetermined position on said surface of said ring, and means securing together said interengaging portions and permanently integrating said ring and said wiper strip means for shipping, handling, storing and applying to a hot top as a unit wherein said means for securing together said interengaged portions of said wiper strip means and said ring for intergrating said ring and said wiper strip means are metallic fasteners extending through said interengaged portions and anchored in said ring.

2. An article of manufacture as defined in claim 1 and wherein said interengaging portions of said wiper strip means and said ring are interengaging bosses and depressions and the means for securing said portions together are nails extending therethrough and having roughened shanks anchored in said ring.

References Cited in the file of this patent

UNITED STATES PATENTS

| | | |
|---|---|---|
| 904,273 | Mundt | Nov. 17, 1908 |
| 1,804,207 | Charman | Feb. 24, 1930 |
| 1,921,731 | Charman | Aug. 8, 1933 |
| 2,258,483 | Charman | Oct. 7, 1941 |
| 2,287,772 | Anthony | June 30, 1942 |
| 2,741,816 | White | Apr. 17, 1956 |